Feb. 22, 1949.   C. H. ZIMMERMAN ET AL   2,462,825
AUTOMATIC DECLUTCHING MEANS FOR MULTIENGINE DRIVES
Filed Nov. 3, 1944   2 Sheets-Sheet 1
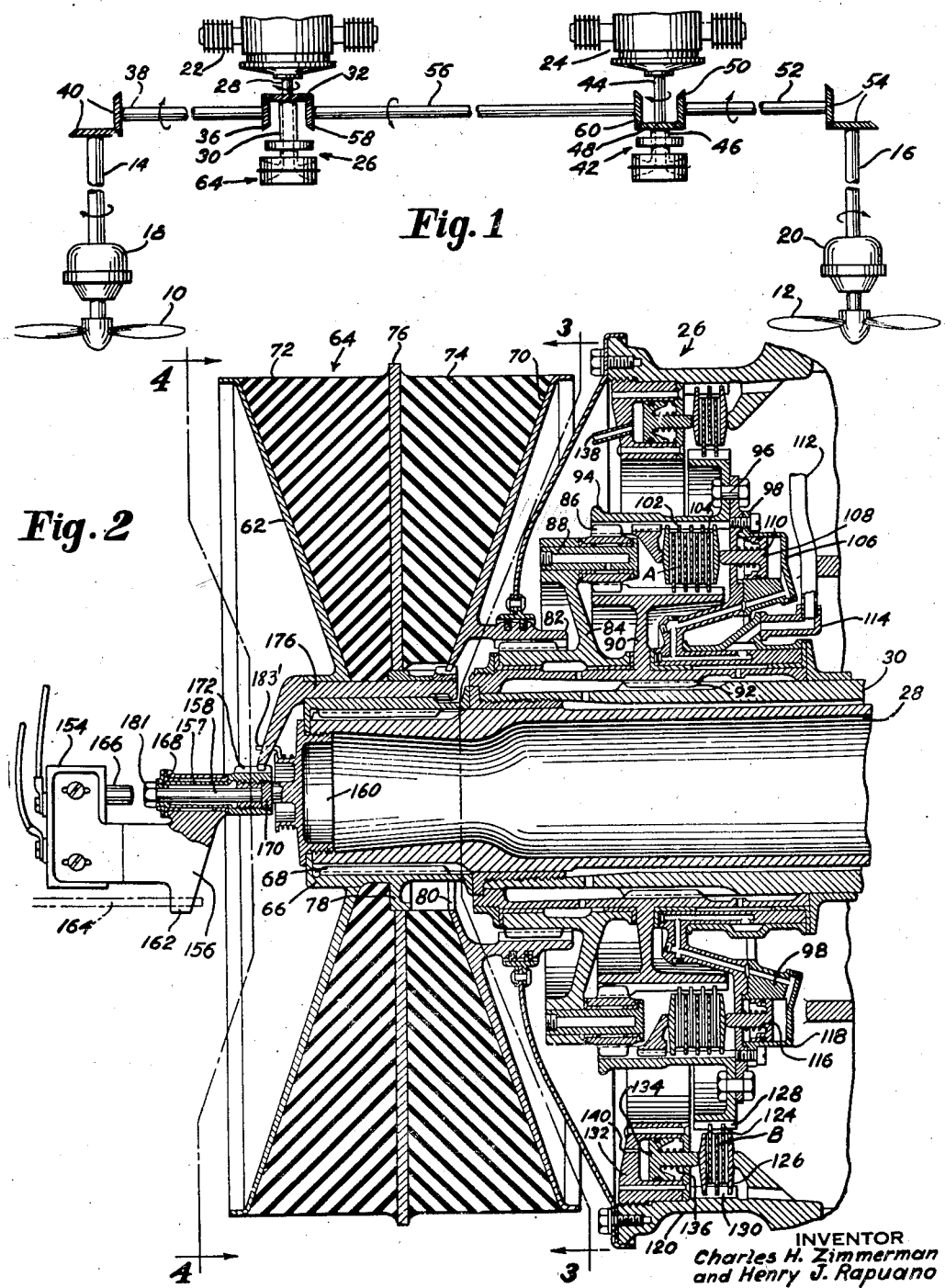
INVENTOR
Charles H. Zimmerman
and Henry J. Rapuano
BY M. B. Tasker
ATTORNEY Feb. 22, 1949.   C. H. ZIMMERMAN ET AL   2,462,825
AUTOMATIC DECLUTCHING MEANS FOR MULTIENGINE DRIVES
Filed Nov. 3, 1944   2 Sheets-Sheet 2

INVENTOR
Charles H. Zimmerman
and Henry J. Rapuano
BY
M. B. Tasker
ATTORNEY

UNITED STATES PATENT OFFICE 2,462,825

AUTOMATIC DECLUTCHING MEANS FOR MULTIENGINE DRIVES

Charles H. Zimmerman, Nichols, and Henry J. Rapuano, Milford, Conn., assignors to United Aircraft Corporation, East Hartford, Conn., a corporation of Delaware Application November 3, 1944, Serial No. 561,812

23 Claims. (Cl. 192—85)

This invention relates to aircraft propulsion and particularly to a propeller drive system for aircraft in which the driving power is supplied by a plurality of engines driving a plurality of interconnected propellers.

An object of the invention is to provide an improved system for driving a plurality of propellers from a plurality of engines having means by which any engine will be automatically disconnected from the system upon failure of that engine.

Another object of the invention is to provide improved means responsive to failure of an engine to develop a predetermined torque for controlling the disconnection of the engine.

A further object of the invention is to provide improved electric switch actuating mechanism associated with each engine and responsive to failure of the engine to develop torque for controlling the disconnection of the engine.

A further object of the invention is to provide a means for elimination of engine drag due to engine failure.

Other objects and advantages of the invention will be apparent from the specification and from the accompanying drawings which illustrate a preferred embodiment of the invention.

In the drawings:

Fig. 1 is a diagrammatic showing of a multi-engine-propeller system embodying the invention.

Fig. 2 is a longitudinal sectional view through the transmission means of one of the engines.

Figure 3:
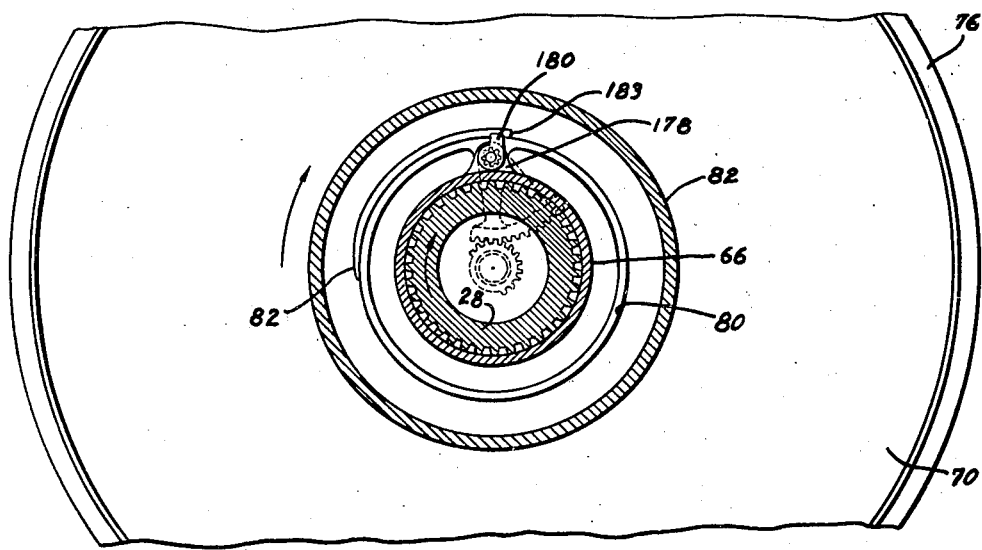
Fig. 3 is a sectional view on line 3—3 of Fig. 2.

As herein shown, two oppositely rotating propellers 10 and 12 having propeller driving shafts 14 and 16 and usual reduction gearing 18 and 20 are driven by two like rotating engines 22 and 24. The engine 22 is connected to the propeller 10 by means of transmission means generally indicated at 26 which includes an inner power input shaft 28 and an outer concentric power output shaft 30. Shaft 30 carries a bevel gear 32 meshing with a bevel gear 36 on a transverse shaft 38 which is connected by a pair of bevel gears 40 to the propeller drive shaft 14. The engine 24 is connected to propeller 12 by means of transmission means generally indicated at 42 which includes an inner power input shaft 44 and an outer concentric power output shaft 46. Shaft 44 carries a bevel gear 48 meshing with a bevel gear 50 on a transverse shaft 52 which is connected with the propeller drive shaft 16 by a pair of bevel gears 54.

The propellers are interconnected by means of a transverse shaft 56 which carries bevel gears 58 and 60 meshing with the gears 32 and 48 respectively. It will be noted that the gears 48 and 32 are located fore and aft respectively of the transverse shafts, whereby the like rotation of the power input shafts 28 and 44 results in the opposite rotation of the propeller drive shafts 14 and 16. Aside from the differences above pointed out in the bevel gear connections between the engines and the propellers, the engine transmission means 26 and 42 are identical and accordingly only the transmission means 26 in connection with the engine 22 will be described in detail.

As shown in Fig. 2, the engine driven, or power input, shaft 28 extends through the transmission means 26 and carries at its forward end an outwardly and forwardly flared flange 62 of a flexible coupling 64 which has a hub 66 integral with flange 62 connected to the shaft 28 by splines 68. The flange 62 is connected to a similar but outwardly and rearwardly flared flange 70 by resilient bodies of rubber 72 and 74 which are bonded to the respective flanges and to an intermediate plate 76 freely supported on an outstanding flange 78 integral with hub 66. It will be noted that the flange member 70 has an enlarged axial aperture 80 which spaces its inner periphery from the hub 66 so that this flange member is supported on the rubber body 74 free from the hub 66. The flange member 70 also has a rearwardly directed annular flange 82 which is operatively connected to and drives change speed gearing which will now be described.

The flange 82 is splined to a planetary pinion carrier 84 journalled on the output shaft 30. A plurality of planetary pinions 86 are rotatably supported on studs 88 in said carrier and mesh with the teeth of a sun gear 90 which is keyed at 92 to shaft 30. The pinions 86 also mesh with the internal teeth of a ring gear 94 which is secured by a series of bolts 96 to an intermediate gear member 98 rotatably supported on the shaft 30.

The teeth of the sun gear 90 and of the ring gear 94 are elongated to provide an annular chamber therebetween for the accommodation of a clutch A consisting of alternate sets of ring shaped plates 102 and 104 provided with teeth on their respective outer and inner peripheries meshing with the teeth of the ring and sun gears 94 and 90 respectively.

The plates of clutch A are moved into engagement to connect the sun and ring gears for bodily rotation by hydraulic means carried by intermediate gear 98 including an annular cylinder 106 containing an annular piston 108, the latter having a plurality of peripherally spaced piston rods 110 which engage the rearmost plate of the clutch. Fluid is supplied through a conduit 112 to a stationary manifold 114 which communicates through suitably interconnecting passages in the intermediate gear member 98 with the interior of cylinder 106. The piston 108 is constantly biased by a plurality of springs 116 on piston rods 110 into a position to disengage the clutch, suitable vents 118 being provided in the cylinder 106 to permit the restricted escape of fluid therefrom to permit the pistons to disengage the clutch under the bias of the spring 116 whenever the supply of fluid to conduit 112 is cut off.

Means are also provided for releasably connecting the ring gear 94 to the casing 120 including a clutch B having sets of ring shaped plates 124 and 126 which are peripherally connected respectively to the external gear teeth 128 and the internal gear teeth 130 on ring gear 94 and casing 120 respectively. A casing supported annular cylinder 132 containing an annular piston 134 both similar to those described in connection with the clutch A are provided for moving the clutch B into engagement against the action of clutch disengaging springs 136, a fluid conduit 138 being provided for admission of fluid to the cylinder, and restricted vents, one of which is shown at 140, being provided for the slow escape of fluid from the cylinder.

Figure 5:
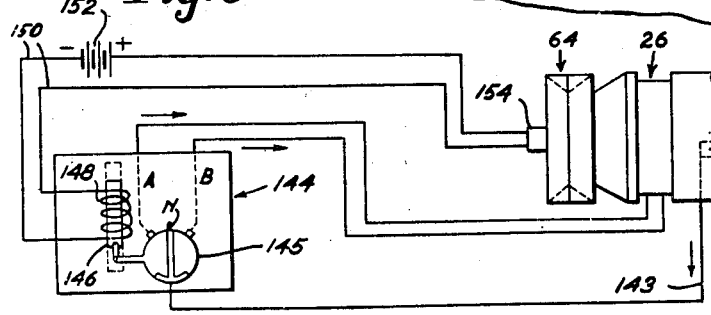
Fig. 5 is a schematic diagram of the control means for one of the engines illustrating the selector valve for pilot control of the change gear mechanism and the electrical means for automatic control of this valve to disconnect the engine.

Referring to Fig. 5, the fluid pump 142 driven by the engine transmission 26 supplies fluid through a conduit 143 to a manually operable selector valve, generally indicated at 144, which may be located in the pilot's compartment convenient to the pilot. As shown diagrammatically in this figure, the movable element 145 of this valve is in a mid-position "N" in which fluid is cut off from both clutches A and B to disconnect the engine. By rotating 145 counterclockwise to position "A" fluid is supplied to clutch A only to provide one drive ratio, whereas rotation of this element clockwise supplies fluid to clutch B only to provide a different drive ratio, as will be hereinafter more fully explained. The transmission means above described for disconnecting the engine from the interconnected propellers or for connecting the latter to the engine in two different drive ratios, is more fully described and is claimed in our copending U. S. application Serial No. 561,811, filed November 3, 1944.

Means are also provided for electrically operating the selector valve 144 to automatically disconnect the drive between shafts 28 and 30 upon failure of the engine. This automatic disconnection is accomplished by a solenoid comprising a core 146 carried by the movable valve element 145 and a coil 148 in a circuit 150 energized by a battery 152. The circuit 150 is controlled by a switch 154, here shown as a micro switch, which is operative in response to a predetermined reduction in engine torque or a reversal of torque, as evidenced by a change in wind-up in the coupling 64. This reversal of torque in the coupling will be clear if it is considered that when engine 22 is running it drives coupling element 62, whereas upon failure of engine 22 the transmission of power through the coupling is reversed, the coupling element 70, driven by engine 24, then becoming the driving element. In either case the coupling is driven in the same direction of rotation.

The switch 154 is carried by a bracket 156 journalled on a sleeve 157 supported on an axial stud 158 projecting forwardly from an integral cap 160 that is screw threaded into the end of the input shaft 28, the stud 158 thus constituting a co-axial, reduced diameter extension of shaft 28. The bracket 156 has a depending portion 162 which may engage an abutment 164 to prevent the bracket from rotating with the rotating stud 158 and sleeve 157.

Switch 154 has an external operating plunger 166 which is normally spaced from but is axially aligned with stud 158, whereby upon rearward movement of sleeve 157 and switch supporting bracket 156 carried thereby the operating member 166 will engage the stud and close the switch. To provide for this rearward movement of the bracket, sleeve 157 has a sliding bearing 168 on stud 158 at its front end. The rear end of sleeve 157 is internally threaded, preferably with quadruple threads, which engage a similarly threaded enlargement 170 on stud 158. Sleeve 157 also carries a segmented gear 172 (Fig. 4) which meshes with a cooperating sector gear 174 integral with a stub shaft 176 journalled in a boss 178 (Fig. 3) formed on the coupling hub 66. The teeth of gear 172 are sufficiently elongated to maintain engagement of gears 172 and 174 during the axial movement of sleeve 157. The stud shaft 176 carries an upstanding projection 180 at its rearmost end which is disposed between spaced abutments 182 and 183 formed by cutting out a portion of the inner periphery of coupling flange 70, as is shown most clearly in Fig. 3. The sleeve 157 is normally maintained in a forward position in which it engages a nut 181 on stud 158 by means of a torsion spring 183'.

When selector valves 144 of both engines 22 and 24 are in the "N" or mid-position shown in Fig. 5, clutches A and B of the engine transmission means of both engines are disconnected, since no fluid is being supplied to cylinders 106 and 132 thereof. Under these conditions any fluid in these cylinders will have been discharged into the interior of transmission casing 120 through the vents 118 and 140 under the bias of springs 116 and 136. Accordingly both engines can be operated free from the propellers during servicing or warming up.

In taking off, when the airplane speed is low, it is desirable to operate the propellers at a higher R. P. M. than would be desirable at cruising speeds. This is accomplished by moving the selector switch element 145 of both engines to position "B" (Fig. 5) to supply high pressure fluid to clutch B only. This results in locking the ring gear 94 to the casing 120 while leaving the sun gear 90 free for rotation relative thereto. As a result the shaft 30 will be driven at a higher rate of speed than the driving shaft 28 due to the planetary movement of the planetary gearing. When it is desired to cruise and this overdrive is no longer desired the pilot moves the selector valves to "A" position in which fluid to clutch B is cut off and fluid is supplied to clutch A. The ring gear 94 is thus free to rotate relative to the casing and is rigidly connected by clutch A to the sun gear 90 and rotates with the latter gear, the whole planetary gearing rotating bodily about the axis of the sun gear 90 and providing a one to one drive ratio between the shafts 28 and 30. It will thus be evident that by manually operating the selector switch the pilot can shift both engines into either the high or the low drive ratio or into a neutral engine-disconnected position.

Figure 4:
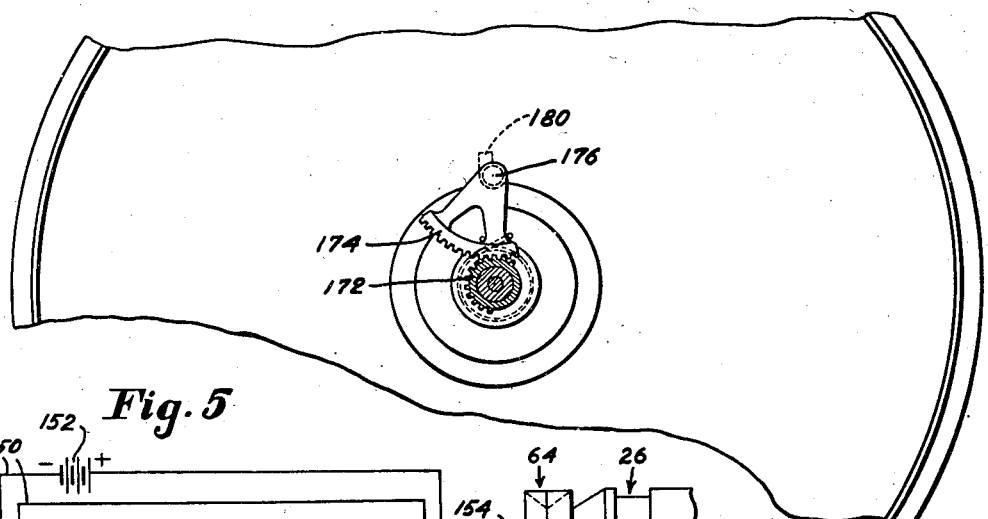
Fig. 4 is a sectional view on line 4—4 of Fig. 2.

Assuming that the engines are connected to the propellers in either one of the high or low gear ratios, the torque exerted by engine 22, for example, on shaft 28 will cause a wind-up of coupling 64, the projection 180 which is in effect rigidly carried by the shaft 28 being moved clockwise as viewed in Fig. 3 in the direction of the abutment 183 of flange 70. In this driving condition of the coupling in which the rubber blocks 72 and 74 are torsionally stressed the coupling is effective in absorbing torsional vibrations in the drive shafts. Furthermore, if the engine 22, for example, should fail to develop a predetermined torque the wind-up in the coupling will be decreased or in the event that the engine fails the transmission of power through the coupling will be actually reversed and the projection 180 will be engaged by the abutment 182, resulting in the clockwise rotation of the stub shaft 176 as viewed in Fig. 3. This movement when translated through the gears 174 and 172 causes the clockwise rotation of the sleeve 157 (as viewed in Fig. 4) against the action of spring 183. The enlarged threaded portion 170 has right hand threads thereon, and hence this clockwise rotation of sleeve 157 will cause the sleeve to be moved rearwardly on stud 158 to close the switch as previously described.

With the element 145 of the selector switch in either position "A" or "B" the solenoid 146 will be displaced axially relative to the solenoid coil 148, as is indicated in dotted lines in Fig. 5. Accordingly, closing of the switch 154 to energize the winding 148 will move the element 145 to "N" position as the core becomes centered in the coil. Regardless of which drive ratio the transmission happens to be in at the time of engine failure, the engine will be instantly and automatically disconnected.

It will be evident that as a result of our improvements means has been provided for automatically disconnecting a faulty engine from a system of inter-connected engines and propellers which is positive in action and extremely rapid in operation.

It will also be evident that a very simple and effective switch operating mechanism has been provided for controlling the operation of a stationary electric switch in response to reversal in torque in a rotating coupling.

While the invention has been described with particular reference to one illustrative embodiment, it will be evident that many changes may be made in the construction and arrangement of the parts without departing from the scope of the invention as defined by the claims.

We claim:

1. In a power transmission mechanism, a power input member, a power output member, a coupling having two elements flexibly connected together, one of which is connected to one of said members, means for releasably connecting the other coupling element with the other of said members, and means for controlling the release of said connecting means including cooperating members rotatable with said coupling elements and relatively movable in response to a predetermined decrease in the power transmitted through said coupling.

2. In a power transmission mechanism, a power input member, a power output member, a coupling having two elements flexibly connected together, one of which is connected to one of said members, means for releasably connecting the other coupling element with the other of said members, means for releasing said connecting means, means carried by one of said members for controlling said releasing means, and actuating means rotatable with said coupling for actuating said controlling means upon a predetermined reduction in the power transmitted through said coupling.

3. In a power transmission mechanism, a power input shaft, a power output shaft, means for releasably connecting said shafts, a coupling in the connection between said shafts having flexibly connected members, means for releasing said shaft connecting means, an electric switch carried by one of said shafts for controlling said last mentioned means, said switch having an external operating member, and cooperating abutment members rotatable with said coupling members engageable upon a predetermined reduction in the power transmitted through said coupling for effecting relative movement between said switch and its switch operating member to actuate the latter.

4. In a power transmission mechanism, a power input shaft, a power output shaft, means for releasably connecting said shafts, a coupling having flexibly connected members, means for releasing said shaft connecting means, a support journalled on one of said shafts, an electric switch mounted on said support for controlling said last mentioned means and having an operating member, means having an abutment carried by one of said coupling members for actuating said switch operating member, and a cooperating abutment on the other coupling member engageable with and moving said first mentioned abutment to actuate said switch upon reversal in the transmission of power through said coupling.

5. In a power transmission mechanism, a power input shaft, a power output shaft, means for releasably connecting said shafts, a coupling having flexibly connected members, means for releasing said shaft connecting means, a support journalled on one of said shafts, an electric switch mounted on said support for controlling said last mentioned means and having an operating member, means movable axially of said shaft for actuating said switch operating member, and means for moving said last mentioned means in response to a predetermined decrease in the power transmitted through said coupling including cooperating engageable abutment means on said coupling members.

6. In a power transmission mechanism, a power input shaft, a power output shaft, means for releasably connecting said shafts, a coupling having flexibly connected members, electrically actuated means for releasing said shaft connecting means, an electric switch supported on one of said shafts for controlling said electrically actuated means and having an operating member disposed in the axis of said switch supporting shaft, a member movable along the axis of said switch supporting shaft for effecting actuation of said switch operating member, and means for moving said axially movable member upon a predetermined decrease in the power transmitted through said coupling including cooperating abutments on said coupling members.

7. In a power transmission mechanism, a power input shaft, a power output shaft, means for releasably connecting said shafts, a coupling having flexibly connected members, electrically actuated means for releasing said shaft connecting means, an electric switch supported on one of said shafts for controlling said electrically actuated means and having an operating member disposed in the axis of said switch supporting shaft, means for effecting relative axial movement of said switch operating member and the support for said switch to operate said switch operating member, and means for effecting said axial movement upon a predetermined decrease in the power transmitted through said coupling including an abutment member on one of said coupling members and a cooperating abutment on said other coupling member.

8. In a power transmission mechanism, a power input shaft, a power output shaft, means for releasably connecting said shafts including a coupling having flexibly connected members operatively connected with said input and output shafts respectively, electrically actuated means for releasing said shaft connecting means, an axially movable sleeve on said input shaft, a support journalled on said sleeve, an electric switch mounted on said support for controlling said electrically actuated means and having a switch operating member disposed in position to engage said input shaft upon axial movement of said sleeve in one direction, an abutment member carried by said input shaft having an operative connection with said sleeve for reciprocating the same, and a cooperating abutment carried by the coupling member connected to said output shaft for engaging said first mentioned abutment upon reversal of torque in said coupling.

9. In a power transmission mechanism, a coupling having flexibly connected members, a power input shaft connected to one of said members, a power output shaft having a connection to said other coupling member, clutch means controlling said connection, electrically operated means governing the connection and disconnection of said clutch means, an electric switch controlling said electrically operated means having a switch operating member, and means responsive to a reversal of torque in said coupling for actuating said switch operating member.

10. In a power transmission mechanism, a coupling having flexibly connected members, a power input shaft connected to one of said members, a power output shaft, clutch means connecting said output shaft and said other coupling member, electrically operated means governing the connection and disconnection of said clutch means, a member concentric with said input shaft and rotatable therewith, a bracket journalled on said concentric member, an electric switch carried by said bracket for controlling the circuit of said electrically operated means and having a switch operating member a portion of which is disposed in the axis of said input shaft, and means responsive to a reversal of torque in said coupling for actuating said switch operating member.

11. In a power transmission mechanism, a coupling having flexibly connected members, an inner power input shaft connected to one of said members, an outer power output shaft concentric with said inner shaft, clutch means connecting said output shaft and said other coupling member, electro-magnetic means governing the disconnection of said clutch means, a member concentric with said input shaft and rotatable therewith, a bracket journalled on said concentric member, an electric switch carried by said bracket for controlling the circuit of said electromagnetic means and having a switch operating member a portion of which is disposed in the axis of said input shaft, and means responsive to a predetermined reduction in torque in said coupling for actuating said switch operating member.

12. In a power transmission mechanism, a coupling having flexibly connected members, a power input shaft connected to one of said members, a power output shaft, clutch means connecting said output shaft and said other coupling member, hydraulic means controlling the engagement and disengagement of said clutch means including a hydraulic valve, electrically operated means for moving said valve, a member concentric with said input shaft and rotatable therewith, a bracket journalled on said concentric member, an electric switch carried by said bracket for controlling the circuit of said electrically operated means and having a switch operating member a portion of which is disposed in the axis of said input shaft, and means responsive to a reversal in the transmission of power through said coupling for actuating said switch operating member.

13. In a power transmission mechanism, a coupling having flexibly connected members, a power input shaft connected to one of said members, a power output shaft, clutch means connecting said output shaft and said other coupling member electrically operated means governing the disconnection of said clutch means, a sleeve member supported by and concentric with one of said shafts, a bracket journalled on said sleeve member, an electric switch carried by said bracket for controlling the circuit of said electrically operated means and having a switch operating member a portion of which is disposed in the axis of said sleeve member, said sleeve member having a threaded connection to its support, means responsive to a predetermined decrease in the power transmitted through said coupling for rotating said sleeve member and moving it axially relative to its support, and an abutment in the path of said switch operating member for actuating the latter.

14. In a power transmission mechanism, a coupling having flexibly connected members, an inner power input shaft connected to one of said members, an outer power output shaft concentric with said input shaft, clutch means connecting said output shaft and said other coupling member, electro-magnetic means governing the disconnection of said clutch means, a sleeve member supported by and concentric with said shafts, a bracket journalled on said sleeve member, an electric switch carried by said bracket for controlling the circuit of said electro-magnetic means and having a switch operating member a portion of which is disposed in the axis of said sleeve member, said sleeve member having a threaded connection to its support, an abutment for limiting the axial movement of said sleeve member in one direction, means for biasing said sleeve member against said abutment, means responsive to a predetermined reduction in the power transmitted through said coupling for rotating said sleeve member to move it axially relative to its support in a direction away from said abutment, and a switch actuating abutment in the path of said switch operating member for actuating the latter upon axial movement of said sleeve member away from its abutment.

15. In a power transmission mechanism, concentric inner and outer input and output shafts, a coupling having flexibly connected members, one of said members having a fixed connection to said input shaft and the other having a releasable connection to said output shaft, electrically actuated means for controlling the release of said connection, a member slidable axially of said shafts, an electric switch carried by said slidable member for controlling said last mentioned means and having an operating member a portion of which is disposed in the axis of said shafts, means including cooperating abutment members on said flexibly connected members for effecting sliding movement of said slidable member in response to a reversal of torque in said coupling, and abutment means carried by said input shaft in the path of said switch operating member.

16. In a power transmission mechanism, concentric inner and outer input and output shafts, a coupling having flexibly connected members, one of said members having a fixed connection to the forward end of said input shaft and the other having a releasable connection to said output shaft, electrically actuated means for controlling the release of said releasable connection, a stud on the forward end of said inner shaft projecting ahead of said coupling, a member slidable axially on said stud and having a threaded connection thereto, an electric switch journalled on said slidable member for controlling said last mentioned means and having an operating member a portion of which is disposed in the axis of said stud, means including cooperating abutment members each movable with a different flexibly connected coupling member for effecting sliding movement of said slidable member to effect operative engagement of said switch operating member with said stud in response to a reversal of torque in said coupling member.

17. In a power transmission mechanism, an inner driving shaft, a coupling mounted on the free end of said shaft including two flexibly connected coupling members, one of which is fixed to said shaft and the other of which is free from operative connection therewith, an outer driven shaft concentric with said driving shaft terminating adjacent said free coupling member, means for operatively connecting said free coupling member with said driven shaft, a clutch controlling said connection, electrically operated means controlling the disengagement of said clutch, means including an electric switch carried by said driving shaft for controlling said electrically operated means, and cooperating switch actuating means carried by said coupling members for operating said switch.

18. In a power transmission mechanism, an inner driving shaft, a coupling mounted on the free end of said shaft including two flexibly connected coupling members, one of which is fixed to said shaft and the other of which is free from operative connection therewith, an outer driven shaft concentric with said driving shaft, said driven shaft terminating adjacent said free coupling member, means for operatively connecting said free coupling member with said driven shaft, a clutch controlling said connection, hydraulic operating means for controlling the engagement and disengagement of said clutch including a valve for controlling the flow of fluid to said hydraulic operating means, electro-magnetic means operative to close said valve to effect disengagement of said clutch, an electric switch carried by said driving shaft for controlling said electro-magnetic means, and switch operating means rotatable with said shafts including abutment means on each of said coupling members engageable upon reversal of torque in said coupling.

19. In a power transmission mechanism, a power input member, a power output member, means for connecting said members including a clutch having separable members and a coupling having flexibly connected elements, means for controlling the separation of said clutch members including an electric switch, means carried by one of said coupling elements for controlling the operation of said switch, and abutment means carried by said other coupling element for engaging said controlling means upon a predetermined change in the torque applied to said input member.

20. In a power transmission mechanism, a power input member, a power output member, means for releasably connecting said members including a clutch, means for releasing said clutch including an electric switch, a coupling in said connection, said coupling having driving and driven elements connected by a resilient body of rubber-like material, and cooperating means carried by said elements and operative in response to a change in the wind-up in said coupling material for controlling said switch.

21. In a power transmission mechanism, a power input shaft, a power output shaft, means for connecting said shafts including a clutch and a coupling in series relation between said shafts, said clutch including separable members and said coupling including flexibly connected elements, means for separating said clutch members, and means including cooperating abutment members carried respectively by said coupling elements and engageable upon a predetermined reduction in torque transmitted through said coupling for controlling the operation of said clutch separating means.

22. In a power transmission mechanism, a power input member, a power output member, means for releasably connecting said members, hydraulic means controlling said connecting means, a coupling in said connection between said members including cooperating flexibly connected elements, and means operative in response to relative movement between said coupling elements as a result of a decrease in torque applied to said input member for controlling the supply of fluid to said hydraulic means.

23. A combination as defined in claim 22 in which the means operative in response to relative movement between the coupling elements includes an electric switch and the hydraulic means includes an electrically operated fluid control valve.

CHARLES H. ZIMMERMAN.
HENRY J. RAPUANO.

REFERENCES CITED.

The following references are of record in the file of this patent:

UNITED STATES PATENTS

| Number | Name | Date |
| --- | --- | --- |
| 1,841,284 | Gillet | Jan. 12, 1932 |
| 2,061,827 | Brooks | Nov. 24, 1936 |
| 2,346,732 | Crawford et al. | Apr. 18, 1944 |